United States Patent [19]

Allison

[11] Patent Number: 4,522,441
[45] Date of Patent: Jun. 11, 1985

[54] COLLAPSIBLE SHELTER

[76] Inventor: Dallas K. Allison, 316 - 41st St., Western Springs, Ill. 60558

[21] Appl. No.: 529,283

[22] Filed: Sep. 6, 1983

[51] Int. Cl.³ .............................................. B60P 3/34
[52] U.S. Cl. ..................................... 296/160; 135/88; 296/161
[58] Field of Search .................... 296/160, 161; 135/88

[56] References Cited

U.S. PATENT DOCUMENTS

| | | | |
|---|---|---|---|
| 2,530,450 | 11/1950 | Cast | 135/88 |
| 2,662,232 | 12/1953 | Daly | 135/88 |
| 2,857,924 | 10/1958 | Gibbons et al. | 135/88 |
| 3,028,609 | 4/1962 | Tolf | 135/88 |
| 3,093,150 | 6/1963 | Schaftener | 135/88 |
| 3,375,836 | 4/1968 | Domenoghetti | 135/88 |
| 3,489,452 | 1/1970 | Plante | 296/161 |
| 4,050,732 | 9/1977 | MacIsaac | 135/88 |
| 4,058,133 | 11/1977 | Barr et al. | 296/160 |
| 4,250,906 | 2/1981 | River et al. | 296/161 |

OTHER PUBLICATIONS

Popular Mechanics, Mar. 1978, p. 115, JC Industries Tent.

Primary Examiner—Robert R. Song
Attorney, Agent, or Firm—Burd, Bartz & Gutenkauf

[57] ABSTRACT

A collapsible shelter mounted on the roof of an automobile has a pair of pivotally connected platforms. A first platform is secured to a frame structure mounted on the roof of the automobile. A second platform is pivotally connected to the first platform and movable from a folded position over the top of the first platform to a second unfolded position adjacent the side of the first platform. A frame assembly cooperates with the platform to erect a tent cover during the pivot movement of the second platform to the open position. The frame assembly is associated with lifting and holding cords that move parts of the frame assembly to unfolded positions during the movement of the second platform to the open position. A ladder support attached to the outer side of the second platform supports the second platform on the ground in its open position.

33 Claims, 20 Drawing Figures

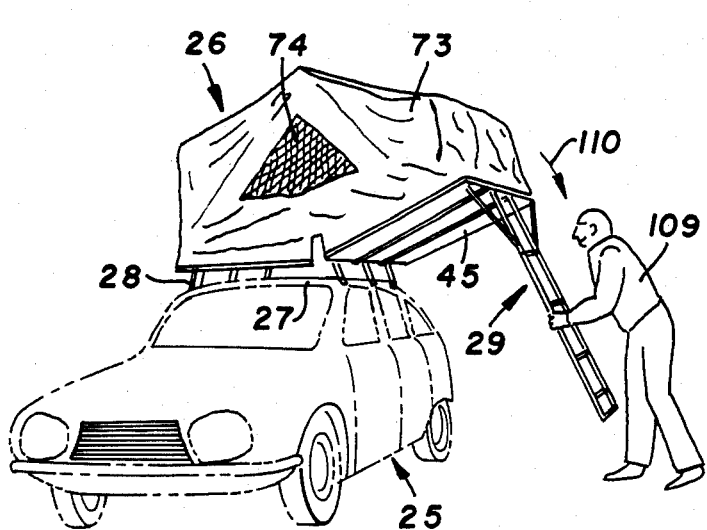
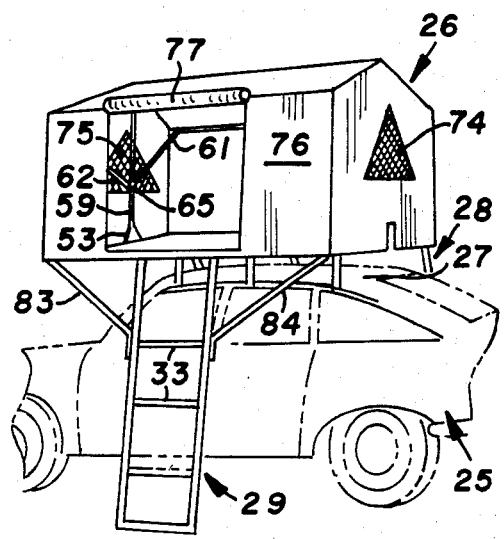
FIG.7    FIG.8
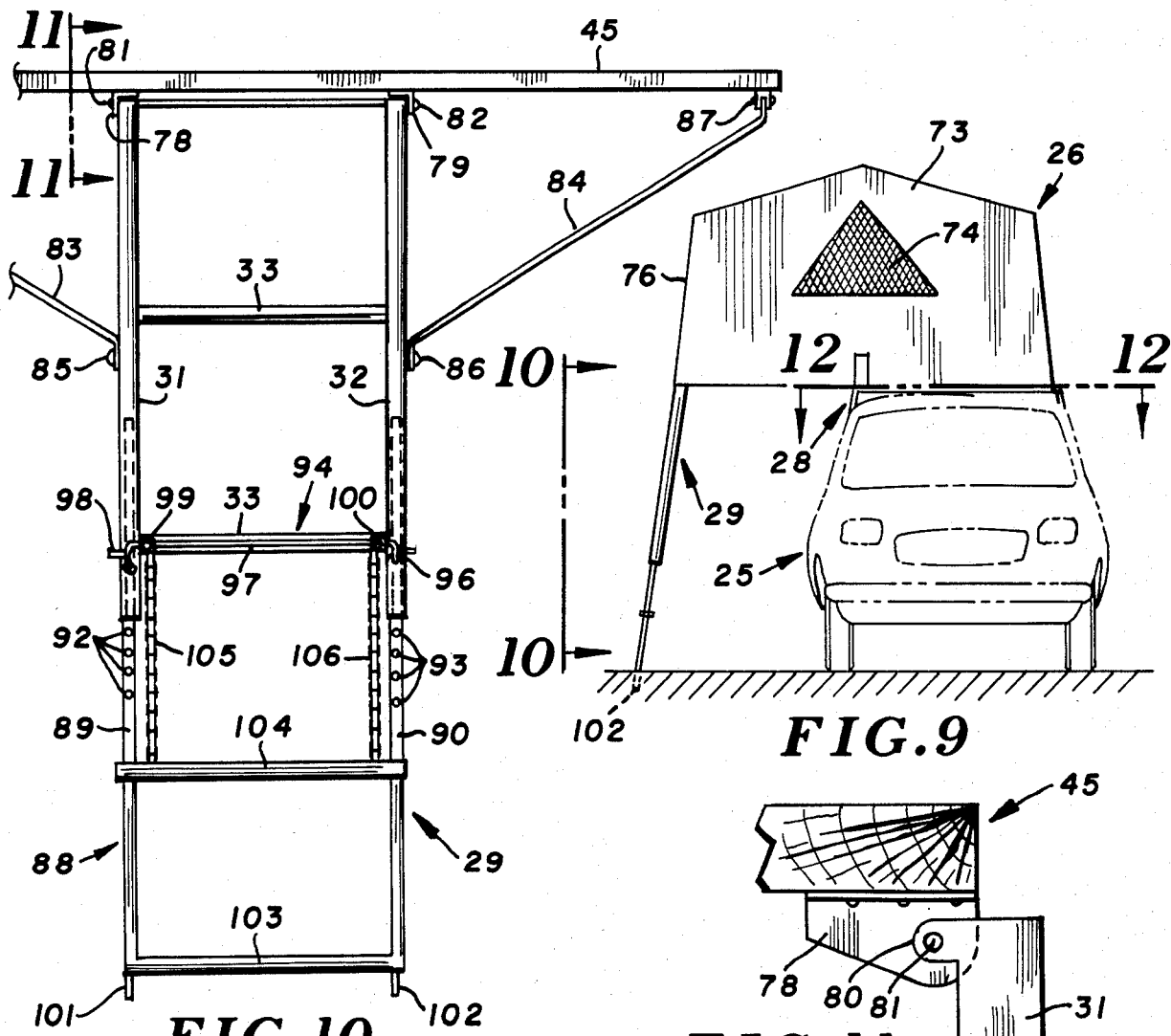
FIG.10    FIG.9
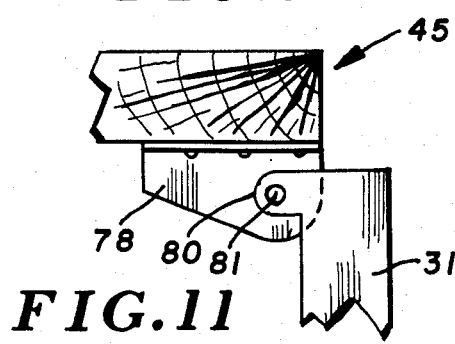
FIG.11

4,522,441

COLLAPSIBLE SHELTER

SUMMARY OF INVENTION

The invention is directed to a portable shelter or tent. More particularly, the invention is a foldable tent shelter mounted on the roof of an automobile and adapted to be erected to an open position without removing the shelter from the roof of the automobile. The shelter has a foldable platform having a first section connected to a mount secured to the roof of the vehicle. A second section is pivotally connected to the first section and movable from a folded stored position to an unfolded open position. A second side support supports part of the second section on the ground when it is in the open position. The second support is an upright ladder which facilitates the entrance into the elevated opening of the shelter.

The shelter has a frame assembly associated with the pivotally connected platforms. The frame assembly includes end posts connected to a longitudinal ridge pole. Side arms slidably mounted on the end posts hold side portions of a tent cover in the open position above the platforms. Lifting cord assemblies associated with the side arms and pivotally mounted platforms function to erect the tent cover and hold the tent cover in the erected position when the movable platform is pivoted to the open position. The end posts are pivotally connected to hinge units that join the platforms together. The side arms are slidably mounted on the posts and connected to the cord assemblies so that when the movable platform is located in the horizontal position the slide assemblies are moved by the cord assemblies thereby moving the arms to their erected or open positions supporting the tent cover in the open position. The second side support is used as a pulling means to facilitate the pivoting of the second platform from the folded position to the open position. The frame assembly moves from a folded position to an open position during the movement of the second platform from the folded position to the open position. The support attaching the first platform to the roof of the vehicle is adjustable to facilitate mounting on different size and types of vehicles. The support has legs that are adjustable in width and length so that they can be attached to the rain gutter structure of different makes and models of motor vehicles.

IN THE DRAWINGS

FIGS. 5 to 8 are perspective views of an automobile carrying a shelter of FIG. 4 showing the procedure for erecting the shelter from the collapsed position to the erected position;

FIG. 9 is a front elevational view of an automobile carrying the shelter of the invention in the open position;

FIG. 10 is an enlarged side elevational view along the line 10—10 looking in the direction of the arrows of FIG. 9;

FIG. 11 is an enlarged sectional view taken along the line 11—11 of FIG. 10;

DESCRIPTION OF PREFERRED EMBODIMENT

Figure 1:
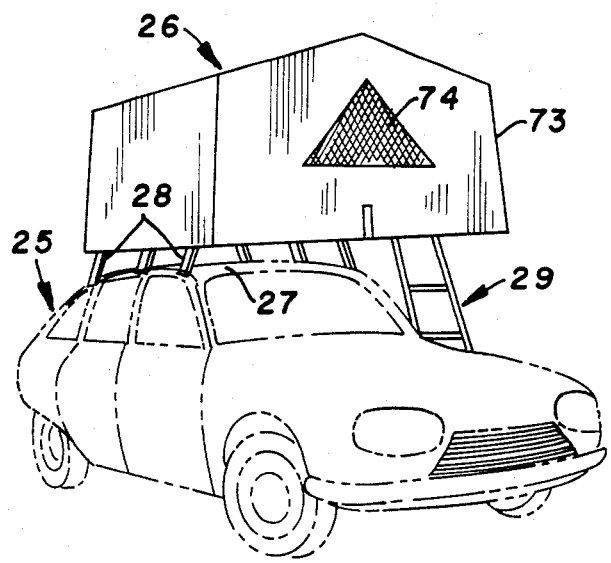
FIG. 1 is a perspective view of an automobile carrying an erected shelter of the invention showing the front and back side of the shelter.
Figure 2:
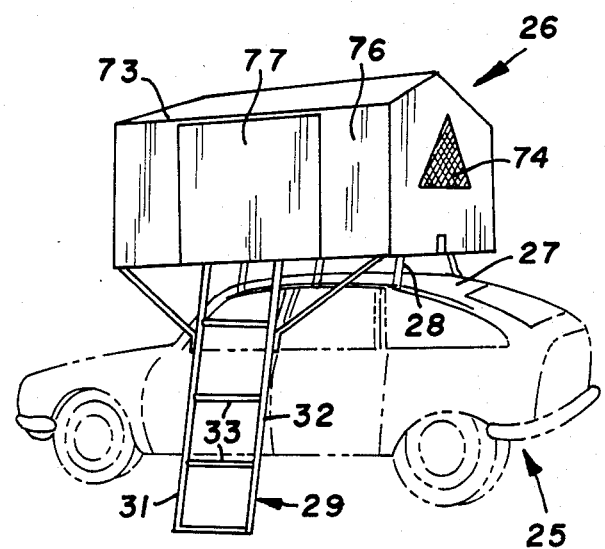
FIG. 2 is a perspective view of an automobile carrying an erected shelter of the invention showing the rear end and entrance side of the shelter.

Referring to FIGS. 1 and 2, there is shown a motor vehicle indicated generally at 25 equipped with a collapsible shelter indicated generally at 26 of the invention. Shelter 26 is in the full open or erected position and is mounted on the top or roof 27 of motor vehicle 25. Motor vehicle 25 can be a passenger car, van, recreational vehicle, as a motor home, travel trailer, or pickup truck, and the like. Other types of vehicles and supports can be used with shelter 26.

A first support means 28 mounts one portion of shelter 26 to vehicle roof 27. A second side support indicated generally at 29 supports a second part of the shelter on the ground adjacent the side of vehicle 25. Side support 29 is an upright ladder having spaced parallel side rails 31 and 32 and a plurality of horizontal steps or rungs 33. The details of the support 29 are hereinafter described and shown in FIG. 10.

Figure 12:
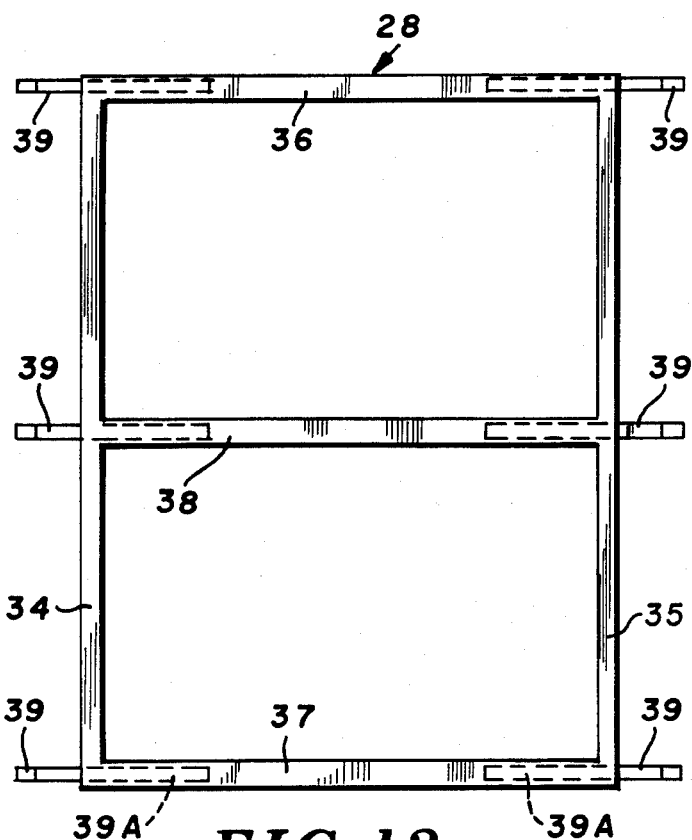
FIG. 12 is a sectional view taken along the line 12—12 of FIG. 9.
Figure 13:
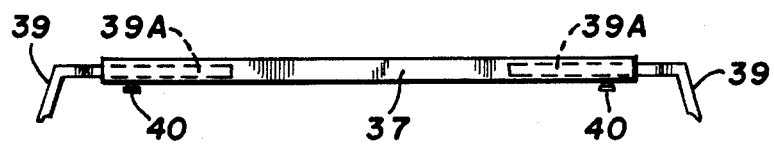
FIG. 13 is an end elevational view of the lower end of FIG. 12.

Referring to FIGS. 12 and 13, support 28 is a rectangular frame structure having longitudinal side members 34 and 35 that extend in the longitudinal direction of vehicle 25. End or transverse members 36 and 37 are secured to opposite ends of members 34 and 35. A middle or intermediate transverse member 38 is joined to the mid sections of members 34 and 35. Members 34-38 are tubular members that are joined together to provide a solid rectangular frame structure.

Figure 14:
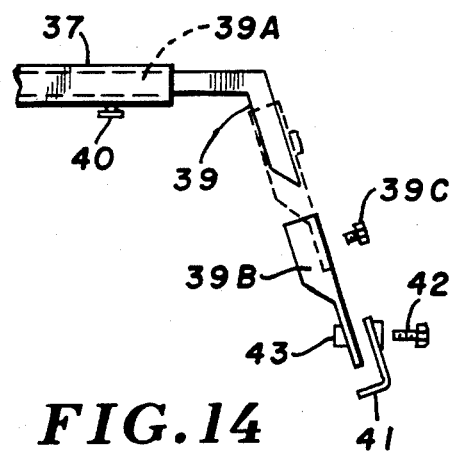
FIG. 14 is an enlarged fragmentary view of the right end of FIG. 13.

As shown in FIGS. 13 and 14, member 37 has opposite ends associated with angled legs 39. Legs 39 have horizontal end portions that project into the opposite ends of tubular member 37 and are secured thereto with clamp bolts 40. Legs 39 have downwardly directed sections that have lower ends 39B that rest in the rain gutter of vehicle roof 27. The ends 39B telescope onto downwardly directed sections of legs 39 and are releasably attached thereto with bolts 39C. Bolts 39C are threaded into one of several holes in legs 39 to adjust the height of frame 28 above vehicle roof 27. Ends 39B are attached to the roof rain molding with an L-shaped clamp 41. A bolt 42 extended through a hole in clamp 41 and threaded into a nut 43 secured to the end of end 39B secures the legs to the roof molding. Bolt 40 can be released so that the leg section 39A can be adjusted relative to the member 37. The adjustment permits the frame support 28 to be mounted on vehicles having different style roof structures.

Figure 15:
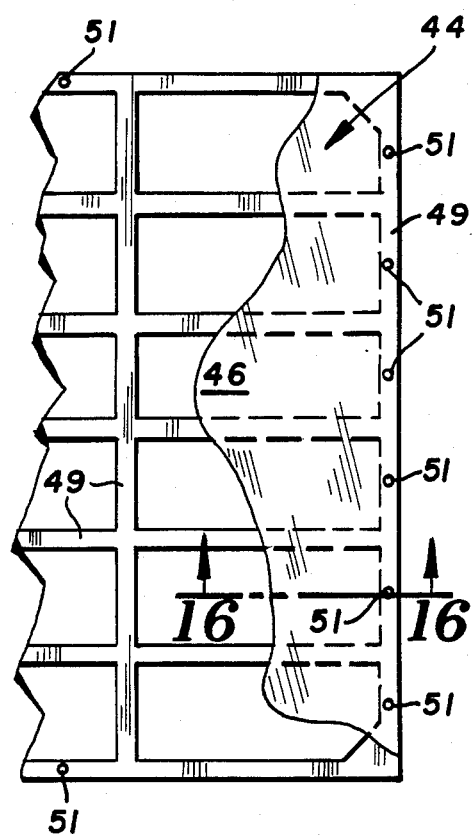
FIG. 15 is a fragmentary plan view of the platform of the shelter.
Figure 16:
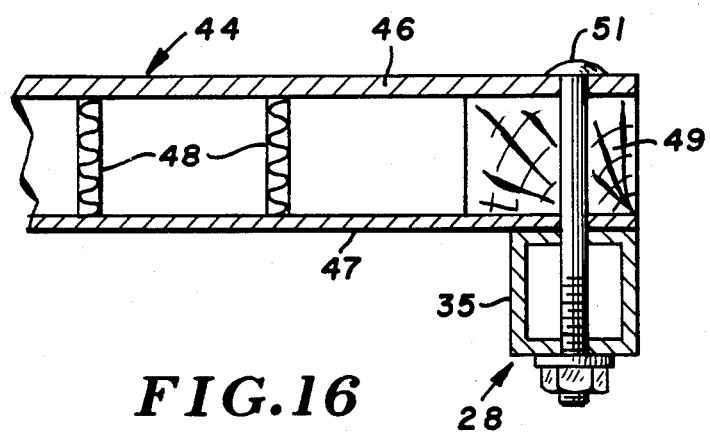
FIG. 16 is an enlarged sectional view taken along the line 16—16.

As shown in FIGS. 15 and 16, a flat floor or platform indicated generally at 44 is mounted on top of support 28. A second platform 45 is pivotally connected to one side of platform 44. Platforms 44 and 45 are identical in construction. The following description is limited to platform 44, as shown in FIGS. 15 and 16. Platform 44 is a laminated structure having a top sheet 46 and a bottom sheet 47. A core 48 is located between sheets 46 and 47 and is secured thereto. Longitudinal and transverse reinforcing members 49 divide core 48 into rectangular sections. Reinforcing members 49 extend around the periphery of sheets 46 and 47. Sheets 46 and 47 can be plywood, hard board, plastic members, and the like. Sheet 47 can be an aluminum sheet metal. Core 48 can be honeycombed cardboard or a foamed plastic, or polystyrene, bonded to the inside surfaces of sheets 46 and 47. As shown in FIG. 16, bolt and nut assemblies 51 secure platform 44 to support 28. Platforms 44 and 45 can be wood, metal, or plastic structures.

Figure 17:
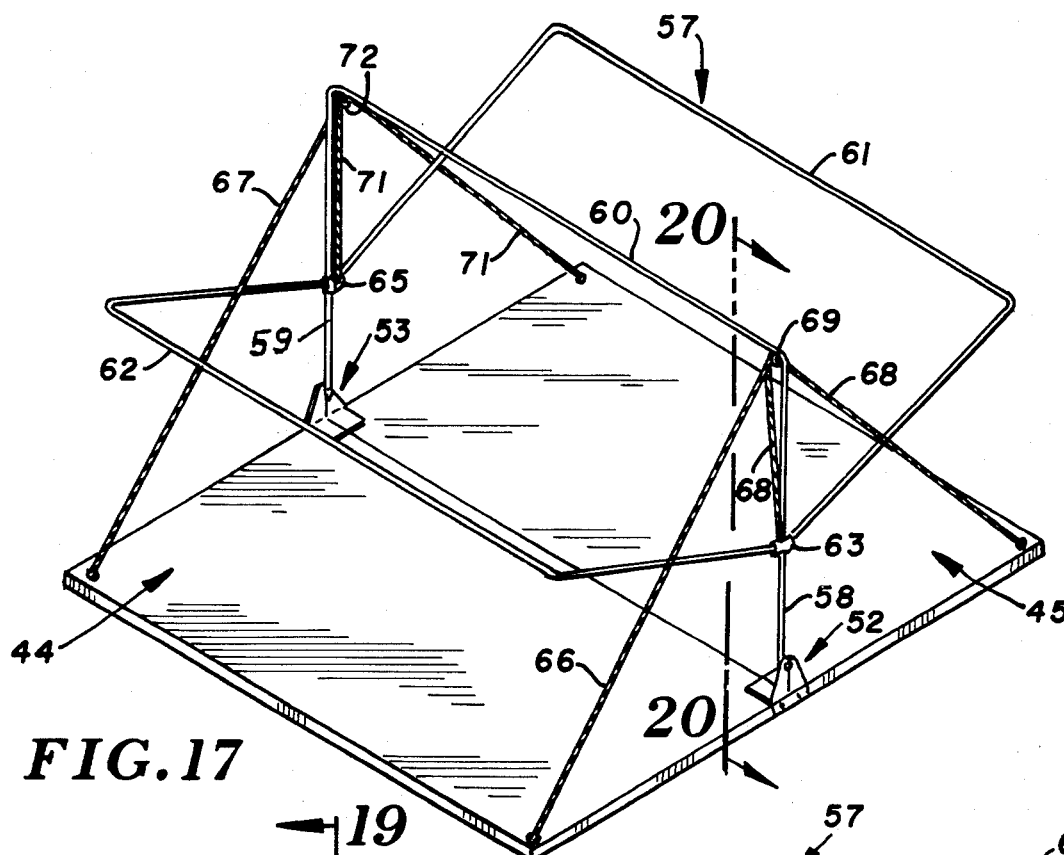
FIG. 17 is a perspective view of the platform and frame structure in the erected position of the shelter.
Figure 19:
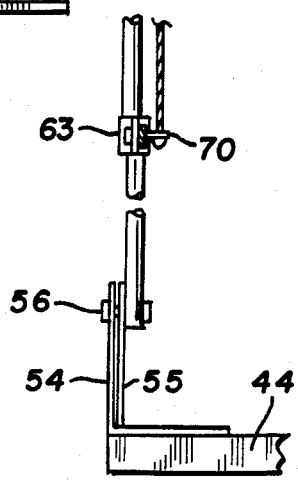
FIG. 19 is an enlarged foreshortened sectional view taken along the line 19—19 of FIG. 18.
Figure 20:
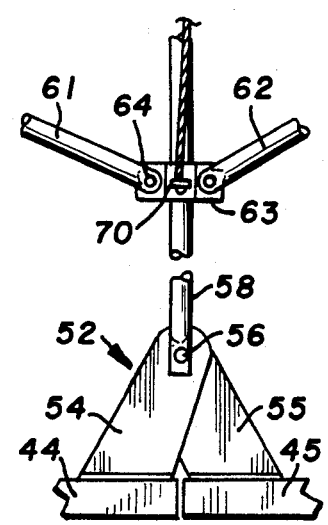
FIG. 20 is an enlarged foreshortened sectional view taken along the line 20—20 of FIG. 17.

As shown in FIG. 17, a pair of hinge units indicated generally at 52 and 53 articuately connect platform 45 to the one side of platform 44. Hinge unit 52 is shown in detail in FIGS. 19 and 20. Hinge unit 52 has a pair of upwardly directed arms 54 and 55. A pivot pin 56 located above platforms 44 and 45 articuately connects the upper ends of arms 54 and 55. Arm 54 is secured to a corner of platform 44. Arm 55 is secured to a corner of platform 45. Hinge unit 53 is identical in construction to hinge unit 54. Hinge units 52 and 53 allow the platform 45 to be pivoted about a generally longitudinal horizontal axis extended above platform 44 along one side thereof to locate platform 45 above platform 44, a shown in FIG. 4, when platform 45 is in its stored position.

Returning to FIG. 17, a skeleton frame assembly indicated generally at 57 is located above platforms 44 and 45 and mounted on hinge units 52 and 53. Frame assembly 57 has a pair of upright center end posts 58 and 59 joined to a horizontal top or ridge pole 60. The lower end of post 58 is connected to hinge unit 52 with pivot member 57. The lower end of post 59 is connected to hinge unit 53 with a similar pivot member.

Figure 18:
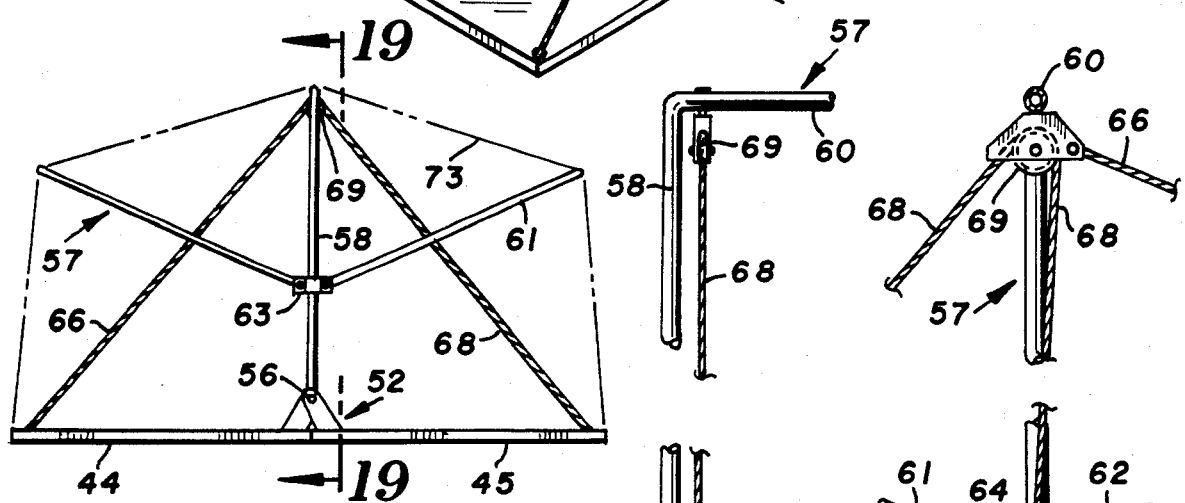
FIG. 18 is an end elevational view of FIG. 17.

Frame assembly 57 includes a pair of oppositely disposed generally U-shaped side arms 61 and 62. Side arms 61 and 62 have adjacent first ends that are connected to a slide saddle 63 with pivot members 64. Slide saddle 63 has a tubular section that is slidably mounted on post 58 for movement along the length of post 58. A second slide saddle 65 is slidably mounted on post 59. Side arms 61 and 62 have second ends that are pivotally connected to slide saddle 65. Side arms 61 and 62 are located along opposite sides of ridge pole 60 and support side sections of tent cover 73, as shown in broken lines in FIG. 18. A first cord 66 is secured to an outside corner of platform 44 and a pulley 69 mounted on ridge pole 60 adjacent post 58. A similar first cord 67 is secured to platform 48 and a pulley 72 secured to ridge pole 60 adjacent post 59. Cords 66 and 67 each have a length to locate ridge pole 60 in a generally upright longitudinal position when cords 66 and 67 are taut. A second cord 68 connects the outer corner of panel 45 to slide saddle 63. Cord 68 is trained about pulley 69. A similar second cord 71 is attached to the opposite corner of platform 45 and slide saddle 65. Cord 71 is trained over pulley 72. When platform 45 is folded to its down or generally horizontal position, as shown in FIG. 17, the second cords 68 and 71 move the slide saddles 63 and 65 up posts 58 and 59, respectively, and locate side arms 61 and 62 in generally outward or spread positions. Cord 68 is secured to slide saddle 63 with an eye 70. A similar eye (not shown) attaches cord 71 to saddle 65.

Cover 73 has top walls, side walls, and end walls to enclosed the space within frame assembly 57. The front wall of cover 73 has a generally rectangular window or screen 74. A similar window or screen 75 is in the rear end of cover 73. Cover 73 has a front side 76 having a centrally located doorway normally closed with a door flap 77. The lower peripheral edges of cover 73 are secured to the outer edges of platforms 44 and 45. Suitable fasteners, as staples, screws releasable snaps, and the like, are usable to attach the lower edge of cover 73 to platforms 44 and 45. Cover 73 can be canvas, nylon faric, or other sheet material. The door 77 can be attached with suitable zippers or Velcro fasteners. Windows 74 and 75 can be covered with mesh or mosquito netting. The windows 74 and 75 can be closed with suitable flaps of canvas or plastic.

Referring to FIG. 10, a pair of downwardly directed brackets 78 and 79 are secured to the center portion of platform 45 adjacent the outer edge thereof. Brackets 78 and 79 are located adjacent upper ends of side rails 31 and 32 and are pivotally connected thereto with pivot members 81 and 82. As shown in FIG. 11, the upper end of side rail 31 has a rearwardly directed ear 80 accommodating the transverse pivot pin 81. A similar pivot pin 82 pivotally connects bracket 79 to the upper end of side rail 31. A first brace 83 extends upwardly and outwardly from the side of side rail 31. A bolt 85 attaches the lower end of brace 83 to side rail 31. The upper end of brace 83 is connected with a hinge (not shown) to platform 45. A second upwardly directed brace 84 extends upwardly and outwardly from side rail 32. A bolt 86 secures the lower end of brace 84 to side rail 32. A hinge 87 pivotally connects the upper end of brace 84 to platform 45.

Support 29 is a two-piece adjustable structure, which includes the side rails 31 and 32 and a base 88. Base 88 has a first upright rod 89 telescoped into the lower end of side rail 32. A second upright rod 90 telescopes up into the lower end of side rail 32. Rods 89 and 90 have holes 92 and 93, respectively, that cooperate with releasable lock 94 to adjust the position of base 88 with respect to the side rails 31 and 32. Lock 94 has a pair of pins 95 and 96 that cooperate with the holes 92 and 93 to fix the extended position of base 88 relative to side rails 31 and 32. Pins 95 and 96 are connected to a transverse rod 97.

Lock 94 has an outwardly directed tab 98 secured to a portion of pin 95. Tab 98 is used to move the pins 95 and 96 out of holes 92 and 93, respectively, so that base 88 can be moved relative to side rails 31 and 32 to a new position. Rod 97 is rotatably mounted on a pair of bearings 99 and 100. The bearings 99 and 100 are secured to opposite ends of a rung 33. Base 88 has a bottom rung or step 103 joined to the lower end of rods 89 and 80. Spikes or pins 101 and 102 project downwardly from opposite ends of rung 103. Spikes 101 and 102 are adapted to dig into the ground adjacent the side of vehicle 25 to anchor support 29. Support 29 has an intermediate rung 104 supported by a pair of chains 105 and 106 from the bottom rung 33 attached to side rails 31 and 32.

Figure 3:
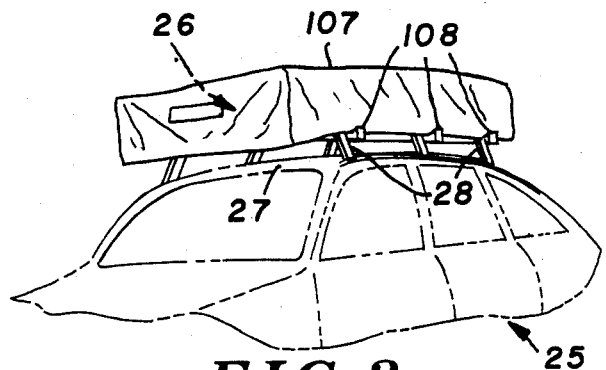
FIG. 3 is a fragmentary perspective view of an automobile carrying a shelter of the invention in the collapsed position within a cover.
Figure 4:
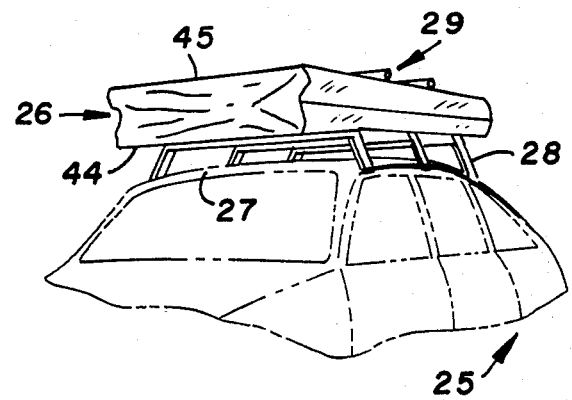
FIG. 4 is a fragmentary perspective view of an automobile carrying a shelter of the invention in the collapsed position.
Figure 5:
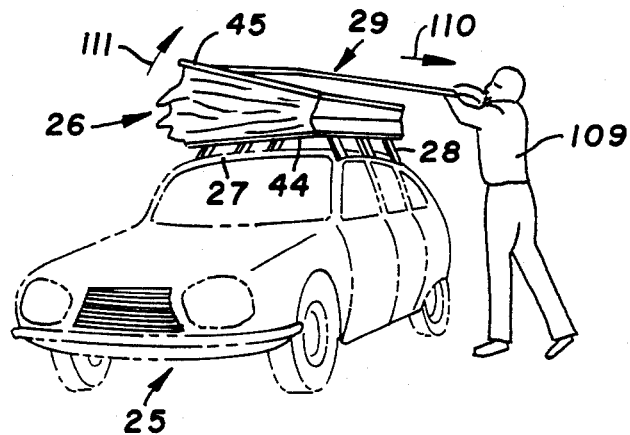
Figure 6:
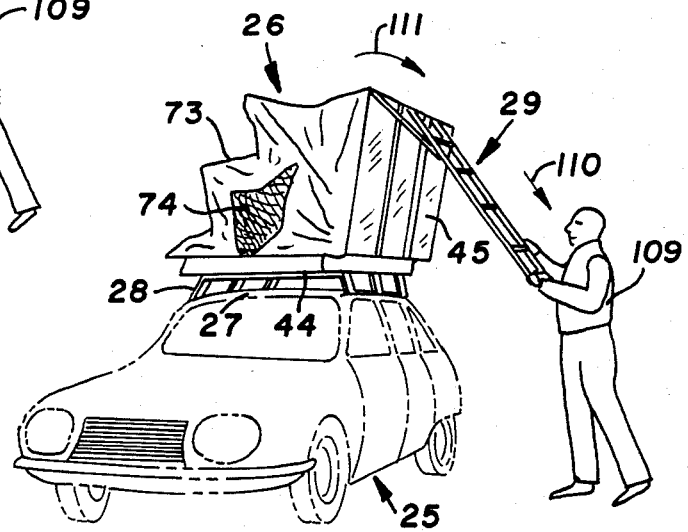

In use, shelter 26 is stored in a folded position on top of platform 44. As shown in FIG. 4, shelter 26 is in a collapsed folded position. In this position it is a generally flat rectangular shape and is supported by support 28 attached to platform 44. Platform 45 covers or is positioned over the folded cover or material 73. Side support 29 is located on top of platform 45. As shown in FIG. 3, a cover 107 surrounds the folded shelter 26. A plurality of elastic holding means 108, as bungie cords, extend under platform 44 to hold the cover 107 on folded shelter 26. When shelter 26 is to be erected or unfolded, cover 107 is initially removed. Referrring to FIG. 5, support 29 is elongated and the person 109 applies or pulls on support 29 in the direction of arrow 110 to pivot platform 45 in an upward direction indicated by arrow 111. Platform 45 pivots about the pivotal axis of hinge units 52 and 53. FIG. 6 shows the continued pulling and pivotal action of platform 45. Shelter cover 73 unfolds. Ridge pole 60 and end posts 48 and 59 also pivot to expand cover 73. FIG. 7 shows support 29 fully extended and platform 45 moving downwardly to the generally horizontal position. The weight of platform 45 aids in the pivotal movement of the direction of the arrow 110. Cords 68 and 71 move saddles 63 and 65 upwardly along end posts 58 and 59, respectively. This extends the side arms 61 and 62 to fill out the shelter cover 73 adjacent opposite sides of ridge pole 60.

Shelter 26 is completely erected by moving the support 29 into engagement with the ground. Spikes 101 and 102 on the lower end of base 88 are forced into the ground thereby stabilizing and anchoring the support 29. The entrance or doorway into the interior of shelter 26 can be opened by releasing the fasteners on door panel 77. Panel 77 can be rolled and stored adjacent the top of the doorway. A screen or mosquito netting can also be attached to the front side wall 76 to facilitate air ventilation through the shelter. Entrance into the shelter is achieved through support 29, which also functions as a ladder. Rungs 103, 104, and 33 function as steps to aid in the climbing up into shelter 26.

Shelter 26 is usable without disconnecting the shelter from support 28 or adding separate structures after the cover 73 has been erected. Shelter 26 can be returned to its folded compact position on top of platform 49, as shown in FIG. 4, by raising the outside platform 45 and pivoting it in an upward direction about the pivot units 52 and 53. When the tension on cords 68 and 71 is relaxed, the saddles 63 and 65 will slide down the end posts 58 and 59, respectively. Cover 73 will follow the side arms 61 and 62. Cover 73 continues to collapse as the side arms 61 and 62 fold toward the ridge pole 60. Support 29 is stored on top of panel 45. Cover 107 is placed over the entire shelter to protect the shelter.

The embodiments of the invention in which an exclusive property or privilege is claimed are defined as follows:

1. A shelter mounted on a vehicle comprising: a vehicle having a roof, a collapsible shelter having a flexible cover, support means mounting the shelter on the roof, said shelter having a first platform attached to the support means, a second platform, hinge means pivotally connecting the second platform to the first platform for movement from a folded position adjacent one side of the first platform to an open position generally in the plane of the first platform, frame means for supporting the flexible cover above the first and second platforms to provide an enclosed space when the second platform is in its open position, said frame means including upright end posts, a ridge pole connected to the end posts, generally U-shaped side arms and saddle means slidably mounted on the end posts and connected to the side arms, means locating the frame means in a position between the folded first and second platforms and erecting the frame means above the platform when the second platform is in the open position, said means locating the frame means in a position between the folded first and second platforms and erecting the frame means above the platforms when the second platform is in the open position being connected to the saddle means and including cord means connected to the end posts and saddle means operable to erect the frame means when the second platform is moved to its open position, and means to support the second platform in its open position.

2. The structure of claim 1 wherein: the support means comprises a frame attached to the first platform, and a plurality of legs connected to the frame, each leg having means to secure the leg to a part of the roof.

3. The structure of claim 2 wherein: each leg has means operable to adjust the length of the leg.

4. The structure of claim 2 including: cooperating means on the frame and each leg for adjusting the location of the leg relative to the frame.

5. The structure of claim 1 wherein: the hinge means comprise a first hinge and a second hinge attached to adjacent corner portions of the first and second platforms.

6. The structure of claim 5 wherein: each hinge has a pair of arms projected away from the first and second platforms, and pivot means pivotally connecting the arms above the platforms when the second platform is in the open position.

7. The structure of claim 1 wherein: said generally U-shaped side arms have ends located adjacent the saddle means, and pivot means pivotally connecting said ends of the U-shaped side arms to said saddle means.

8. The structure of claim 1 including: means pivotally connecting the end posts to said hinge means.

9. A shelter mounted on a vehicle comprising: a vehicle having a roof, a collapsible shelter having a flexible cover, support means mounting the shelter on the roof, said shelter having a first platform attached to the support means, a second platform, hinge means pivotally connecting the second platform to the first platform for movement from a folded position adjacent one side of the first platform to an open position generally in the plane of the first platform, frame means for supporting the flexible cover above the first and second platforms to provide an enclosed space when the second platform is in its open position, said frame means including upright end posts, a ridge pole connected to the end posts, generally U-shaped side arms, and saddle means slidably mounted on the end posts and connected to the side arms, said means locating the frame means in a position between the folded first and second platforms and erecting the frame means above the platforms when the second platform is in the open position being connected to the saddle means and includes first cord means connected to the end posts to locate the end posts in an upright position, and second cord means connected to the saddle means and second platform, said second cord means operable to raise the saddle means to extend the side arms when the second platform is moved to its open position, and means to support the second platform in an open position.

10. The structure of claim 9 including: pulley means connected to the frame means accommodating said second cord means.

11. The structure of claim 9 wherein: the means to support the second platform in its open position includes a ladder and means for pivotally connecting a portion of the ladder to the second platform.

12. The structure of claim 11 wherein: said ladder has a pair of elongated side members and a base movably mounted on said side members, and lock means for holding the base in a selected position relative to the side members whereby the length of the ladder can be adjusted.

13. A collapsible shelter comprising: a first platform, a second platform, a flexible cover attached to said first and second platforms adapted to provide an enclosed space, hinge means pivotally connecting the second platform to the first platform for movement of the second platform from a folded position adjacent one side of the first platform to an open position generally in the plane of the first platform, frame means for supporting the flexible cover above the first and second platforms to provide an enclosed space when the second platform is in the open position, said frame means includes upright end posts, a ridge pole connected to the end posts, generally U-shaped side arms, and saddle means slidably mounted on the end posts and connected to the side arms, and means connected to the saddle means for locating the frame means in a position between the folded first and second platforms and erecting the frame means above the platforms when the second platform is in the open position, said last means including cord means connected to the end posts and saddle means operable to erect the frame means when the second platform is moved to its open position.

14. The structure of claim 13 wherein: said generally U-shaped side arms have ends located adjacent th saddle means, and pivot means pivotally connecting said ends of the U-shaped side arms to said saddle means.

15. The structure of claim 13 including: means pivotally connecting the end posts to said hinge means.

16. A collapsible shelter comprising: a first platform, a second platform, a flexible cover attached to said first and second platforms adapted to provide an enclosed space, hinge means pivotally connecting the second platform to the first platform for movement of the second platform from a folded position adjacent one side of the first platform to an open position generally in the plane of the first platform, frame means for supporting the flexible cover above the first and second platforms to provide an enclosed space when the second platform is in the open position, said frame means including upright end posts, a ridge pole connected to the end posts, generally U-shaped side arms, and saddle means slidably mounted on the end posts and connected to the side arms, and means connected to the saddle means and platforms for locating the frame means in a position between the folded first and second platforms and erecting the frame means above the platforms when the second platform is moved to the open position, said last means including first cord means connected to the end posts to locate the end posts in an upright position, and second cord means connected to the saddle means and second platform, said second cord means operable to raise the saddle means to extend the side arms when the second platform is moved to its open position.

17. The structure of claim 16 including: pulley means connected to the frame means accommodating said second cord means.

18. The structure of claim 13 including: means to support the second platform in its open position including a ladder and means for pivotally connecting a portion of the ladder to the second platform.

19. The structure of claim 18 wherein: said ladder has a pair of elongated side members and a base movably mounted on said side members, and lock means for holding the base in a selected position relative to the side members whereby the length of the ladder can be adjusted.

20. The structure of claim 18 wherein: the hinge means comprise a first hinge and a second hinge attached to adjacent corner portions of the first and second platforms.

21. The structure of claim 20 wherein: each hinge has a pair of arms projected away from the first and second platforms, and pivot means pivotally connecting the arms above the platforms when the second platform is in the open position.

22. A collapsible shelter adapted to be mounted on a support comprising: a first platform, means for mounting the first platform on the support, a second platform, a flexible cover attached to said first and second platforms adapted to provide an enclosed space, hinge means pivotally connecting the second platform to the first platform for movement of the second platform from a folded position adjacent one side of the first platform to an open position generally in the plane of the first platform, frame means for supporting the flexible cover above the first and second platforms to provide an enclosed space when the second platform is in the open position, said frame means including upright end posts, a ridge pole connected to the end posts, generally U-shaped side arms, and saddle means slidably mounted on the end posts connected to the side arms, means connected to the saddle means locating the frame means in a position between the folded first and second platforms and erecting the frame means above the platforms when the second platform is in its open position, said last means including cord means connected to the end posts and saddle means operable to erect the frame means when the second platform is moved to its open position, and means to support the second platform in its open position.

23. The structure of claim 22 wherein: the means for mounting the first platform on the support comprises a frame attached to the first platform, and a plurality of legs connected to the frame, each leg having means to secure the leg to a part of the roof.

24. The structure of claim 23 wherein: each leg has means operable to adjust the length of the leg.

25. The structure of claim 23 including: cooperating means on the frame and each leg for adjusting the location of the leg relative to the frame.

26. The structure of claim 22 wherein: the hinge means comprise a first hinge and a second hinge attached to adjacent corner portions of the first and second platforms.

27. The structure of claim 26 wherein: each hinge has a pair of arms projected away from the first and second platforms, and pivot means pivotally connecting the arms above the platforms when the second platform is in the open position.

28. The structure of claim 22 wherein: said generally U-shaped side arms have ends located adjacent the saddle means, and pivot means pivotally connecting said ends of the U-shaped side arms to said saddle means.

29. The structure of claim 22 including: means pivotally connecting the end posts to said hinge means.

30. A collapsible shelter adapted to be mounted on a support comprising: a first platform, means for mounting the first platform on the support, a second platform, a flexible cover attached to said first and second platforms adapted to provide an enclosed space, hinge means pivotally connecting the second platform to the first platform for movement of the second platform from a folded position adjacent one side of the first platform to an open position generally in the plane of the first platform, frame means for supporting the flexible cover above the first and second platforms to provide an enclosed space when the second platform is in the open position, said frame means including upright end posts, a ridge pole connected to the end posts, generally U-shaped side arms, and saddle means slidably mounted on the end posts and connected to the side arms, and means connected to the saddle means locating the frame means in a position between the first folded and second platforms and erecting the frame means above the platform when the second platform is in the open position, said last means including first cord means connected to the end posts to locate the end posts in an upright position, and second cord means connected to the saddle means and second platforms, said second cord means operable to raise the saddle means to extend the side arms when the second platform is moved to its open position, and means to support the second platform in its open position.

31. The structure of claim 30 including: pulley means connected to the frame means accommodating said second cord means.

32. The structure of claim 30 wherein: the means to support the second platform in its open position includes a ladder and means for pivotally connecting a portion of the ladder to the second position.

33. The structure of claim 32 wherein: said ladder has a pair of elongated side members and a base movably mounted on said side members, and lock means for holding the base in a selected position relative to the side members whereby the length of the ladder can be adjusted.

* * * * *

UNITED STATES PATENT AND TRADEMARK OFFICE
CERTIFICATE OF CORRECTION

PATENT NO. : 4,522,441
DATED : June 11, 1985
INVENTOR(S) : Dallas K. Allison

It is certified that error appears in the above-identified patent and that said Letters Patent is hereby corrected as shown below:

Column 3, line 36, "a" should be --as--.

Column 4, line 19, "faric" should be --fabric--.

Column 5, line 20, "48" should be --58--.

Column 7, line 39, "th" should be --the--.

Signed and Sealed this

Twenty-fourth Day of September 1985

[SEAL]

Attest:

DONALD J. QUIGG

Attesting Officer

Commissioner of Patents and
Trademarks—Designate